L. MANGUS.
Pitman-Connections.

No. 158,852.    Patented Jan. 19, 1875.

UNITED STATES PATENT OFFICE.

LEVI MANGUS, OF NORTH LIBERTY, INDIANA.

IMPROVEMENT IN PITMAN-CONNECTIONS.

Specification forming part of Letters Patent No. 158,852, dated January 19, 1875; application filed November 29, 1873.

*To all whom it may concern:*

Be it known that I, LEVI MANGUS, of North Liberty, in the county of St. Joseph and State of Indiana, have invented a new and valuable Improvement in Pitman-Connections; and I do hereby declare that the following is a full, clear, and exact description of the construction and operation of the same, reference being had to the annexed drawings making a part of this specification, and to the letters and figures of reference marked thereon.

Figure 1:
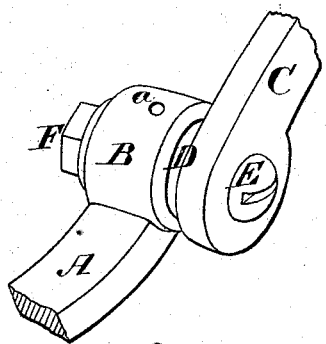
Figure 2:
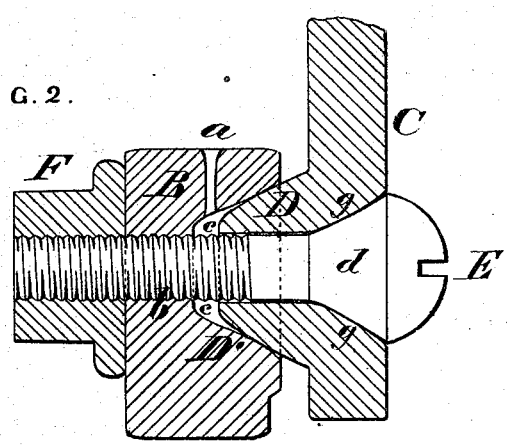
Figure 3:
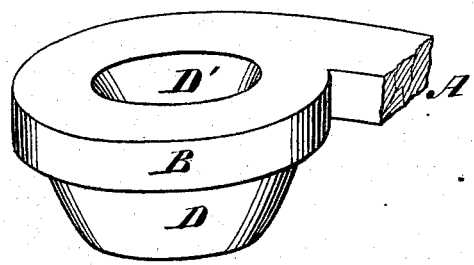

Figure 1 of the drawings is a representation of a perspective view of my pitman-connection. Fig. 2 is a sectional view of the same. Fig. 3 is a detail view of the same.

This invention has relation to joint connections between the pitman-rods and sickle-bars of harvesting-machines. It consists in the construction and arrangement of the parts, as will be hereinafter more fully described and claimed.

The following is a description of my improved joint.

In the annexed drawing, A represents the sickle-bar of a harvesting-machine, and C the pitman-rod, which communicates reciprocating motion to the sickle from the main driving mechanism on the draft-frame. On one end of the sickle A an eye, B, is formed, which has a conical recess, D', formed into it, also a perforation, a, for the supply of oil. Concentric to the recess D' a hole, b, is made through the eye B, and screw-tapped, for the purpose of receiving a center pivot-screw, E. On one side of the extremity of the pitman C a conical pivot, D, is formed, which is received into the recess D', but does not entirely fill up this recess. Into the opposite side of the pitman C, and concentric to the conical pivot D, a conical recess, g, is formed. I thus have three conical surfaces, D', D, and g, which are concentric to the pivot-screw E. The pivot-screw E is constructed with a conical head, d, which snugly fits into the recess g, as shown in Fig. 2. This screw E is not tapped through the pitman, but it is tapped—that is to say, its thread engages with the female thread through the sickle-bar eye B; consequently, by means of the nut F on the screw E, this screw is jammed tightly.

It will be observed, by reference to Fig. 2, that the hole a leads into a chamber, c, which surrounds the screw E inside of the eye B of the sickle-bar, and as this chamber communicates with the conical-bearing of the pivot D, and also the eye through D, through which the screw E passes, the wearing-surfaces of the joint can all be freely lubricated.

When the joint wears loose it can readily be tightened by setting up the screw E, and then tightening the nut F.

Cone-joint pitman-connections have been used before my invention, and I do not wish to be understood as making a broad claim to such means for connecting a sickle-bar to its pitman.

What I claim as new, and desire to secure by Letters Patent, is—

1. The pitman-connection, consisting of the sickle-bar A, having on one end the eye B, with conical recess D' and perforations $a$ $b$, the pitman C, having conical pivot D, and conical recess $g$, and the pivot-screw E, with conical head $d$ and nut F, all constructed and arranged as shown and described.

2. The pitman-head C, having on one side the conical projecting bearing D, and centrally opposite the same on the other side, the conical-bearing recess $g$ terminating in a perforation through said conical projecting bearing, as specified.

In testimony that I claim the above I have hereunto subscribed my name in the presence of two witnesses.

LEVI MANGUS.

Witnesses:
LEVI STULL,
JOHN OLINGER.